(No Model.)

C. E. W. WOODWARD.
REPAIRING TOOL FOR PNEUMATIC TIRES.

No. 510,664. Patented Dec. 12, 1893.

Witnesses
J. H. Shumway
C. P. Kellogg

Charles E. W. Woodward
Inventor
By Atty

UNITED STATES PATENT OFFICE.

CHARLES E. W. WOODWARD, OF CHICOPEE FALLS, MASSACHUSETTS, ASSIGNOR TO THE OVERMAN WHEEL COMPANY, OF SAME PLACE, AND HARTFORD, CONNECTICUT.

REPAIRING-TOOL FOR PNEUMATIC TIRES.

SPECIFICATION forming part of Letters Patent No. 510,664, dated December 12, 1893.

Application filed February 24, 1893. Serial No. 463,531. (No model.)

*To all whom it may concern:*

Be it known that I, CHARLES E. W. WOODWARD, of Chicopee Falls, in the county of Hampden and State of Massachusetts, have invented a new Improvement in Repairing-Tools for Pneumatic Cycle-Tires; and I do hereby declare the following, when taken in connection with accompanying drawings and the letters of reference marked thereon, to be a full, clear, and exact description of the same, and which said drawings constitute part of this specification, and represent, in—

Figure 1:
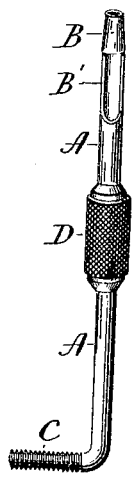
Figure 3:
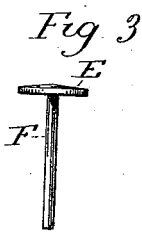
Figure 2:
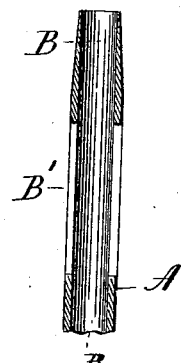
Figure 4:
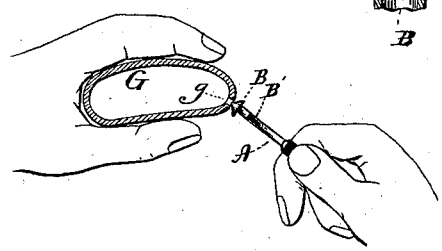

Figure 1, a view in side elevation of a repairing-tool constructed in accordance with my invention; Fig. 2, a broken enlarged view partly in elevation and partly in section, showing the socketed end of the tool; Fig. 3, a similar view of the rivet-shaped rubber patch which it applies; Fig. 4, a view showing the operation of applying such a patch by means of my improved repairing-tool.

My invention relates to an improvement in repairing-tools for closing punctures in pneumatic cycle tires, with small rivet-shaped rubber patches, the object being to produce for the purpose specified, a simple, convenient and highly effective tool.

With this end in view, my invention consists in a tool having certain details of construction as will be hereinafter described and pointed out in the claims.

As herein shown, my improved tool is constructed from a single piece of metal, and has a straight main-portion A, of circular cross-section. At one end it is constructed with a deep circular bore or socket B, and tapered to a thin edge, and formed with an elongated lateral opening B', substantially corresponding in width to the diameter of the said bore. At its opposite end it is preferably bent at a right angle, and threaded to form a threaded finger C, which, though greatly adding to the convenience of the tool, is not an essential feature. Preferably, also, I provide the straight main-portion of the tool with a knurled hub or enlargement D, to facilitate its manipulation, and particularly its rotation during the use of its threaded finger before mentioned.

This tool is designed to be used in conjunction with a rivet-shaped patch of soft rubber, comprising a small thin, flexible disk E, having a rounded or slightly conical outer, and a flat inner face, and a shank F, located at a right angle to the plane of the disk, and joining the same in the center of the flat inner face thereof. The said patch may vary somewhat in dimensions and form from the form which it has as shown in Fig. 2 of the drawings. For instance, its disk may be made larger and thinner, and its shank larger and shorter.

For convenience in illustrating the use of my improved tool, I have shown in Fig. 3 of the drawings a tube G, having a puncture *g*, the said tube being the removable inner tube of a pneumatic cycle tire.

In using my improved tool, I first insert its threaded finger C, into the puncture, and then rotate the tool so that its threaded finger will scrape the inside of the tube to be mended, in a circle around the puncture. This operation removes the white dust which is given out by the rubber, and prepares the same for the adhesion to it of the inner surface of the disk of the patch. The threaded end of the tool may now be dipped in cement, which will fill its screw-threads. It is then pushed straight through the puncture, and removed by unscrewing, whereby the cement which it took up will be left within the puncture. By preference, this operation should be repeated several times. Meanwhile the inner face of the disk of the patch should be heavily coated with cement and the same allowed to get dry. The shank of the patch is now inserted into the socket of the repairing tool, and its end pulled through the lateral opening therein, whereby its disk may be drawn firmly down against the end thereof. The patch is then covered with cement by dipping it into the same, or applying the same thereto with a brush. Then the patch is introduced into the tube G, as shown by Fig. 3 of the drawings, through the puncture *g*, the disk being folded, as shown in the said figure of the drawings, at this time. The tool is now removed, and the patch pulled outward by its shank, whereby the inner face of the disk is drawn against that portion of the inner surface of the tube which surrounds the puncture. The tube is now flattened and rolled or pressed, so as to secure a good adhesion between the disk and tube, after which the shank is cut off close to the outer surface of the tube. A patch thus applied being located on the inside of the tube is protected from the influences which would tend to impair an outside patch, and is assisted in being retained in place by the pressure within the tube.

While I have spoken only of pneumatic tires, it is of course apparent that my improved tool may be used in applying similar patches to other hollow articles, such as balls, foot-balls, rubber-hose, hot-water bags, &c.

Having fully described my invention, what I claim as new, and desire to secure by Letters Patent, is—

1. A tool for repairing punctures in pneumatic cycle-tires, constructed at one end with a deep circular bore or socket, and tapered to a thin edge, and formed with a lateral opening substantially corresponding in width to the diameter of the said bore or socket, substantially as described.

2. A tool for repairing punctures in pneumatic cycle-tires, constructed at one end with a deep circular bore or socket, and tapered to a thin edge, and formed with a lateral opening substantially corresponding in width to the diameter of the said bore or socket, and furnished at its opposite end with screw-threads, substantially as described.

3. A tool for repairing punctures in pneumatic cycle-tires, constructed at one end with a socket having a lateral opening, having its other end bent and screw-threaded, and furnished between its ends with a knurled hub or enlargement, substantially as described.

In testimony whereof I have signed this specification in the presence of two subscribing witnesses.

CHARLES E. W. WOODWARD.

Witnesses:
G. H. E. HAWKINS,
C. C. MORGAN.